United States Patent
Ma et al.

(10) Patent No.: US 11,356,999 B2
(45) Date of Patent: Jun. 7, 2022

(54) METHOD AND APPARATUS FOR BLIND DETECTION OF PDCCH AND PDSCH USING UE-SPECIFIC REFERENCE SIGNALS

(71) Applicant: Intel IP Corporation, Santa Clara, CA (US)

(72) Inventors: Xiaojun Ma, Munich (DE); Zhibin Yu, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/041,493

(22) PCT Filed: Jun. 30, 2018

(86) PCT No.: PCT/CN2018/093889
§ 371 (c)(1),
(2) Date: Sep. 25, 2020

(87) PCT Pub. No.: WO2020/000478
PCT Pub. Date: Jan. 2, 2020

(65) Prior Publication Data
US 2021/0127369 A1    Apr. 29, 2021

(51) Int. Cl.
*H04W 72/04*    (2009.01)
*H04W 24/10*    (2009.01)
(Continued)

(52) U.S. Cl.
CPC ......... *H04W 72/042* (2013.01); *H04L 5/0048* (2013.01); *H04W 24/10* (2013.01); *H04W 72/14* (2013.01)

(58) Field of Classification Search
CPC ... H04W 72/042; H04W 24/10; H04W 72/14; H04L 5/0048
See application file for complete search history.

(56) References Cited

U.S. PATENT DOCUMENTS

2013/0034070 A1    2/2013  Seo et al.
2015/0282192 A1   10/2015  Shin et al.
(Continued)

FOREIGN PATENT DOCUMENTS

CN        102055689 A        5/2011

OTHER PUBLICATIONS

International Search Report based on PCT Application No. PCT/CN2018/093889 (3 pages) dated Mar. 11, 2019 (for references purposes only).

*Primary Examiner* — Ronald B Abelson
(74) *Attorney, Agent, or Firm* — Viering, Jentschura & Partner mbB

(57) ABSTRACT

Provided herein are a method and an apparatus for blind detection of Physical Downlink Control Channel (PDCCH) and Physical Downlink Shared Channel (PDSCH) using UE-specific reference signals. In an embodiment, the disclosure provides an apparatus for a UE, comprising circuitry configured to: measure a UE-specific Demodulation Reference Signal (DMRS) associated with a PDCCH; compute a first measurement metric M1 based on the UE-specific DMRS associated with the PDCCH before decoding the PDCCH; decode the PDCCH based on the first measurement metric M1; and decode PDSCH based on the decoded PDCCH. The disclosure may further, based on the corresponding PDCCH DMRS and/or PDSCH DMRS, determine if a PDSCH grant in a decoded PDCCH is valid or not, detect a repeated PDSCH grant in a slot, and detect cross-slot DMRS phase continuity between continuous slots.

25 Claims, 9 Drawing Sheets

(51) Int. Cl.
*H04W 72/14* (2009.01)
*H04L 5/00* (2006.01)

(56) References Cited

U.S. PATENT DOCUMENTS

2016/0316459 A1 10/2016 Popovic et al.
2018/0167920 A1* 6/2018 Kim .................. H04L 5/0053

* cited by examiner

METHOD AND APPARATUS FOR BLIND DETECTION OF PDCCH AND PDSCH USING UE-SPECIFIC REFERENCE SIGNALS

CROSS-REFERENCE TO RELATED APPLICATIONS

This is a U.S. national-phase application of PCT Application PCT/CN2018/093889, which was filed on Jun. 30, 2018, the entire contents of which are incorporated herein by reference.

TECHNICAL FIELD

Aspects of the present disclosure generally relate to the field of wireless communications, and particularly to a method and an apparatus for blind detection of Physical Downlink Control Channel (PDCCH) and Physical Downlink Shared Channel (PDSCH) using User Equipment (UE)-specific reference signals.

BACKGROUND ART

In the Downlink (DL) data transmission of Long Term Evolution (LTE) system or 5th generation (5G) New Radio (NR) system, multiple UEs in a cell dynamically multiplex time-frequency resources, and what time-frequency resources are occupied by a UE is determined by a PDCCH corresponding to the UE. PDCCH generally indicate PDSCH grant information and other signaling such as Uplink resource allocation information for the UE, and the UE is required to detect and decode related PDCCH and PDSCH.

SUMMARY

An aspect of the disclosure provides an apparatus for a user equipment (UE), the apparatus including circuitry configured to: measure a UE-specific Demodulation Reference Signal (DMRS) associated with a PDCCH; compute a first measurement metric M1 based on the UE-specific DMRS associated with the PDCCH before decoding the PDCCH; decode the PDCCH based on the first measurement metric M1; and decode a PDSCH based on the decoded PDCCH.

An aspect of the disclosure provides an apparatus for a UE, the apparatus including circuitry configured to: obtain configuration information of a received UE-specific PDSCH DMRS associated with a PDSCH grant in a previous slot n−1; generate a hypothetical UE-specific PDSCH DMRS in current slot n based on the obtained configuration information of the received UE-specific PDSCH DMRS in the previous slot n−1; compute a third measurement metric M3 based on the hypothetical UE-specific PDSCH DMRS; compare the third measurement metric M3 with a fourth threshold TH4; determine a repeated PDSCH grant is detected in the current slot n when the third measurement metric M3 is larger than the fourth threshold TH4 TH4 TH4(M3>TH4); and decode the PDSCH in the current slot n based on the detected PDSCH grant.

An aspect of the disclosure provides an apparatus for a UE, the apparatus including circuitry configured to: extrapolate PDSCH DMRS channel estimates from a previous slot n−1 onto a first DMRS position of a current slot n; measure the extrapolated PDSCH DMRS channel estimates based on the a received PDSCH DMRS in the previous slot n1 and frequency domain filtered channel estimates of the current slot n based on a received PDSCH DMRS in the current slot n; compute Mean Square Error (MSE) based on the extrapolated channel estimates and the frequency domain filtered channel estimates of the current slot n; compare the MSE with a fifth threshold TH5; determine cross-slot DMRS phase continuity between the previous slot n−1 and the current slot n based on the result of the comparison and perform cross-slot PDSCH channel estimation based on the cross-slot DMRS phase continuity between the previous slot n−1 and the current slot n.

BRIEF DESCRIPTION OF THE DRAWINGS

Aspects of the disclosure will be illustrated, by way of example and not limitation, in the figures of the accompanying drawings in which like reference numerals refer to similar elements.

DETAILED DESCRIPTION

Various aspects will be described using terms commonly employed by those skilled in the art to convey the substance of their work to others skilled in the art. However, it will be apparent to those skilled in the art that many alternate aspects may be practiced using portions of the described aspects. For purposes of explanation, specific numbers, materials, and configurations are set forth in order to provide a thorough understanding of the illustrative aspects. However, it will be apparent to those skilled in the art that alternate aspects may be practiced without the specific details. In other instances, well known features may have been omitted or simplified in order to avoid obscuring the illustrative aspects.

Further, various operations will be described as multiple discrete operations, in turn, in a manner that is most helpful in understanding the illustrative aspects; however, the order of description should not be construed as to imply that these operations are necessarily order dependent. In particular, these operations need not be performed in the order of presentation.

The phrase "according to an aspect" is used repeatedly herein. The phrase generally does not refer to the same aspect of the disclosure; however, it may. The terms "including,", "having," and "including" are synonymous, unless the context dictates otherwise. The phrases "A or B" and "A/B" mean "(A), (B), or (A and B)."

Figure 1:
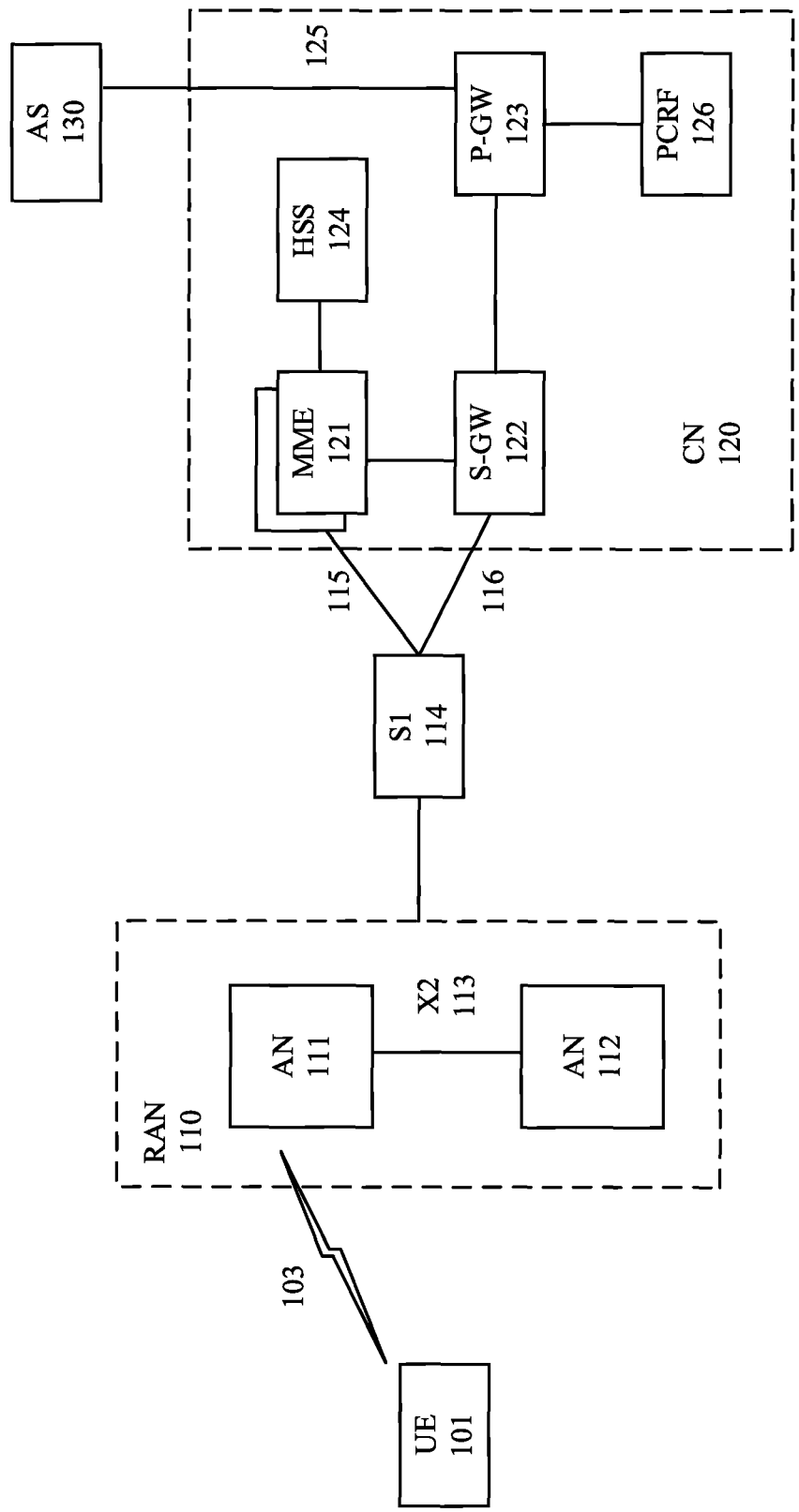
FIG. 1 illustrates an architecture of a system 100 of a network in accordance with some aspects.

FIG. 1 illustrates an architecture of a system 100 of a network in accordance with some aspects. The system 100 is shown to include a user equipment (UE) 101. The UE 101 is illustrated as a smartphone (e.g., handheld touchscreen mobile computing devices connectable to one or more cellular networks), but may also include any mobile or non-mobile computing device, such as a personal data assistant (PDA), a tablet, a pager, a laptop computer, a desktop computer, a wireless handset, or any computing device including a wireless communications interface.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a Next Gen RAN (NG RAN), or some other type of RAN. The UE 101 may utilize a connection 103 which includes a physical communications interface or layer (discussed in further detail below); in this example, the connection 103 is illustrated as an air interface to enable communicative coupling and may be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs) that enable the connection 103. These access nodes may be referred to as base stations (BSs), NodeBs, evolved NodeBs (eNBs), next Generation NodeBs (gNB), RAN nodes, and so forth, and may include ground stations (e.g., terrestrial access points) or satellite stations providing coverage within a geographic area (e.g., a cell). As shown in FIG. 1, for example, the RAN 110 may include AN 111 and AN 112. The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to macro ANs. For example, one or both of the AN 111 and AN 112 may be a low power (LP) AN. According to an aspect of the disclosure, the AN 111 and AN 112 may be the same type of AN. In another embodiment, they are different types of ANs.

Any of the ANs 111 and 112 may terminate the air interface protocol and may be the first point of contact for the UE 101. According to some aspect of the disclosure, any of the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some aspects, the UE 101 may be configured to communicate using Orthogonal Frequency-Division Multiplexing (OFDM) communication signals with any of the ANs 111 and 112 or with other UEs (not shown) over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the aspects is not limited in this respect. The OFDM signals may include a plurality of orthogonal subcarriers.

According to some aspect of the disclosure, a downlink resource grid may be used for downlink transmissions from any of the ANs 111 and 112 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 101. The physical downlink control channel (PDCCH) may carry information about the transport format and resource allocations related to the PDSCH channel, among other things. It may also inform the UE 101 about the transport format, resource allocation, and H-ARQ (Hybrid Automatic Repeat Request) information related to the uplink shared channel. Typically, downlink scheduling (assigning control and shared channel resource blocks to the UE 101 within a cell) may be performed at any of the ANs 111 and 112 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 114. According to some aspect of the disclosure, the CN 120 may be an evolved packet core (EPC) network, a NextGen Packet Core (NPC) network, or some other type of CN. In an aspect of the disclosure, the S1 interface 114 is split into two parts: the S1-mobility management entity (MME) interface 115, which is a signaling interface between the ANs 111 and 112 and MMEs 121; and the S1-U interface 116, which carries traffic data between the ANs 111 and 112 and the serving gateway (S-GW) 122.

In an aspect of the disclosure, the CN 120 may include the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may include a database for network users, including subscription-related information to support the network entities' handling of communication sessions. The CN 120 may include one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an aspect of the disclosure, the P-GW 123 is communicatively coupled to an application server 130 via an IP communications interface 125. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (HPCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

In LTE or 5G NR system, false positive PDCCH decoding happens when a downlink receiver of a UE decodes a PDCCH with a successful Cyclic Redundancy Check (CRC), even though the PDCCH is actually not issued by an AN, e.g., AN 111, to the UE, e.g., UE 101. When the PDCCH is false positively decoded, it may include a false positive grant, e.g., a false positive Downlink (DL) grant and/or a false positive Uplink (UL) grant, which is harmful to modem performance as well as power consumption. For example, it may cause an un-expected DLNACK sent back to the AN, which may confuse the DL scheduler. In addition, unnecessary power consumption may be caused for processing the non-existing PDSCH allocation, for example, it may trigger unexpected UL transmission if there is a false positive UL grant. In LTE system, the false positive grants can be detected by exploring soft-bits from PDCCH data subcarriers, e.g., mapping the PDCCH soft-bits into certain metrics and comparing with a threshold. However, the existing method purely relying on the PDCCH data subcarriers always make a compromise between a false positive rate and decoding sensitivity, specifically, if the false positive rate is reduced, the decoding sensitivity will degrade, and vice visa.

In 5G NR system, a Demodulation Reference Signal (DMRS) associated with PDCCH and a DMRS associated with PDSCH have been introduced for demodulating the related PDCCH and PDSCH, respectively. The PDCCH/PDSCH DMRS are UE-specific but not cell-specific, it means the reference signals are allocated to the associated UE only if the corresponding PDCCH/PDSCH is also allocated. As a consequence, 5G NR reference signals for PDCCH/PDSCH reflect the grant information and can be explored to reduce false positive grants.

A novel proposal is provided to determine whether to decode a PDCCH or not based on the DMRS of the PDCCH, and to determine if a PDSCH grant is valid or not based on the PDCCH DMRS and the PDSCH DMRS both. The proposal will be discussed in details below.

Figure 2:
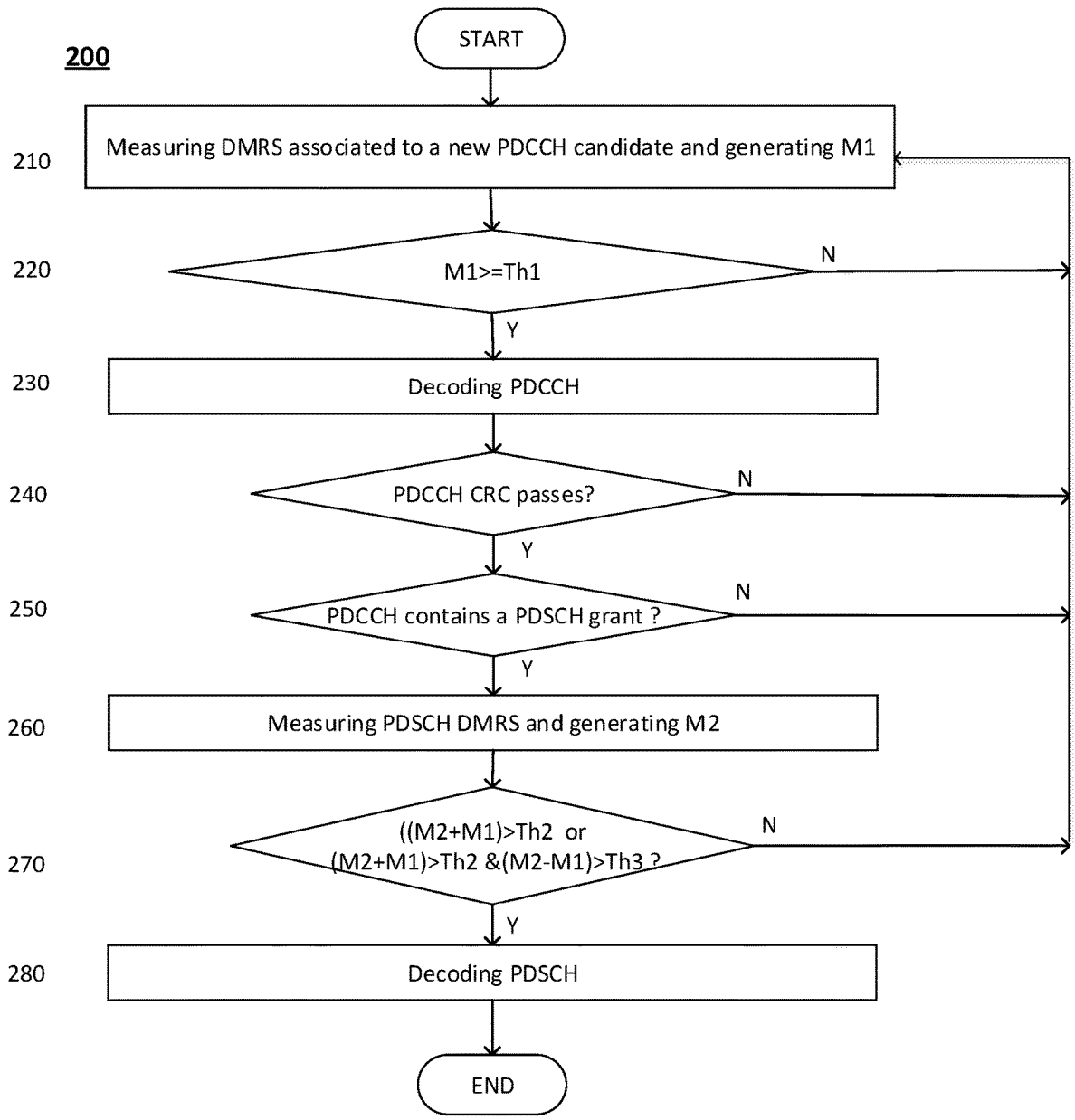
FIG. 2 illustrates a flow chart of a method for blind detection of a PDCCH and a PDSCH grant based on a PDCCH DMRS and a PDSCH DMRS in accordance with some aspects of the disclosure.

FIG. 2 illustrates a flow chart of a method 200 for blind detection of a PDCCH and a PDSCH grant based on a PDCCH DMRS and a PDSCH DMRS in accordance with some aspects of the disclosure. The method 200 may be applied to or performed by a UE, for example, UE 101 of FIG. 1.

The method 200 may include, at 210, for a PDCCH candidate, measuring a UE-specific DMRS associated with the PDCCH (PDCCH DMRS for short) and computing a first measurement metric M1 based on the measured PDCCH DMRS before decoding the PDCCH.

In an aspect of the disclosure, M1 can be the post filtering DMRS Signal-Noise Ratio (SNR) for control region:

$$M_1 = 10\log \frac{\sum_{1}^{nRefSym} \|\hat{H}\|^2}{\sum_{1}^{nRefSym} \|(H - \hat{H})\|^2} \quad (1)$$

where $\hat{H}$ stands for frequency-time filtered demodulated PDCCH DMRS and H stands for unfiltered demodulated PDCCH DMRS.

In an aspect of the disclosure, M1 may be a scalar product based metric, or a time offset estimation metric, etc.

The method 200 may further include, at 220, comparing the M1 with a first threshold TH1. The UE (e.g., UE 101), determine to decode the PDCCH when the M1 is not smaller than TH1 (M1>=TH1), and determine not to decode the PDCCH when M1 is smaller than TH1 (M1<TH1) and look back to try for next candidate PDCCH, so as to pre-exclude un-allocated PDCCH, as shown at 230.

In an aspect of the disclosure, the UE may start with a first control-resource set (CORESET) configured by the network, declare an associated PDCCH is found in this CORESET when the M1 is not smaller than the TH1, and decode the PDCCH. When the M1 is smaller than the TH1, the UE may declare no associated PDCCH found in this CORESET, and then look back to try for next CORESET candidate.

The TH1 has to be defined such that the false negative rate is very low, in order not to miss a valid PDCCH. In an aspect of the disclosure, the TH1 may be dynamically determined based on an aggregation level of PDCCH channel and the number of UE receiver antennas, and TH1 may increase with the increase of the aggregation level of PDCCH channel or the number of UE receiver antennas, specifically, the higher the aggregation level or the bigger the number of receive antennas, the bigger the TH1.

As an example, when the number of the UE receiver antennas is 4, and the aggregation level of PDCCH channel is 2 CCEs, the TH1 may be −5 dB.

In an aspect of the disclosure, the UE (e.g., UE 101) may further obtain the result of PDCCH CRC, and perform further operations to determine whether the PDCCH grant in the decoded PDCCH is valid or not based on the PDCCH DMRS and the PDSCH DMRS.

The method 200 may further include, at 240, determining the result of a Cyclic Redundancy Check (CRC) for the PDCCH, and determining if a PDSCH grant is included in the decoded PDCCH when the CRC passes at 250. If there is a PDSCH grant in the decoded PDCCH, measuring a UE-specific DMRS associated with the PDSCH grant (PDSCH DMRS for short) and computing a second measurement metric M2, which is similar to M1, based on the PDSCH DMRS using the same formula for M1 at 260. In an aspect of the disclosure, if M1 is the post filtering SNR, M2 is also the post filtering SNR, computed as:

$$M_2 = 10\log \frac{\sum_{1}^{nRefSym} \|\hat{H}\|^2}{\sum_{1}^{nRefSym} \|(H - \hat{H})\|^2} \quad (2)$$

where $\hat{H}$ stands for frequency-time filtered demodulated PDSCH DMRS and H stands for unfiltered demodulated PDSCH DMRS.

According to some aspect of the disclosure, M1 and M2 may be a scalar product based metric. In some aspects, M1 and M2 may be a time offset estimation metric.

The method 200 may further include, determining whether the PDSCH grant is valid or not based on M1 and M2 at 270, and decoding the PDSCH when the PDSCH grant is valid at 280. Since PDSCH DMRS only exists together with a valid PDSCH grant, M2 would be very small if the grant is incorrect. Thus the determination at 270 can be based on the sum of M1 and M2. In one aspect of the disclosure, the UE may compare the sum of M1 and M2 with a second threshold TH2 and determine the PDSCH grant is valid only when the sum of M1 and M2 is larger than TH2, i.e., M1+M2>TH2. When the sum is not larger than TH2, it can be declared that a false positive grant is detected, in other words, the PDSCH grant is not directed to the UE.

In another aspect of the disclosure, the determination at 270 can be based on the sum of M1 and M2 as well as the different between M2 and M1 both. In an aspect of the disclosure, the UE may compare the sum (M1+M2) with TH2 as described above, compare the difference (M2−M1) with a third threshold TH3, and determine the PDSCH grant is valid when the sum (M1+M2) is larger than TH2 and the difference (M2−M1) is larger than TH3 (M1+M2>TH2 and M2−M1>TH3). There are two judgment conditions here, wherein the first condition is to compare the sum (M1+M2) with TH2, which is to make a decision for a false positive grant. The second condition is to compare the difference (M2−M1) with TH3, which is very helpful when there should be a grant but not detected correctly, or the decoded PDCCH does not contain downlink grant but it is falsely detected. In this case, M1 should be much higher than M2 since the grant does not exist in this region.

In an aspect of the disclosure, TH2 can be defined a bit larger than TH1 because the confidence level is higher with the combination of both PDSCH DMRS and PDCCH DMRS. In an aspect of the disclosure, the second threshold TH2 may be dynamically determined based on an aggregation level of PDCCH channel, the number of UE receiver antennas and the number of allocated resource blocks (RBs) in the PDSCH grant. The second threshold TH2 may increase with the increase of the aggregation level of PDCCH channel, the number of UE receiver antennas or the number of allocated RBs in the PDSCH grant, specifically, the higher the aggregation level, the bigger the number of receive antennas or the bigger the number of allocated RBs, the bigger the TH2. As an example, when the number of the UE receiver antennas is 4, and the aggregation level of PDCCH channel is 2 CCEs, and the number of allocated RB is 15, TH2 may be −2 dB.

In an aspect of the disclosure, TH3 may be dynamically determined based on the number of allocated resource blocks (RBs) in the PDSCH grant, and TH3 may increase with the increase of the number of allocated RBs in the PDSCH grant, specifically, the larger the number of allocated RBs, the higher the TH3. As an example, when the number of allocated RB is 15, TH3 may be 6 dB.

In an aspect of the disclosure, if a detected grant passes all checks, it may be added to the set of
valid grant list. After going through all CORESETs configured by network, the collected valid grants are processed. If no grant has been detected, the UE aborts the rest downlink process related to PDSCH decoding.

In 5G NR system, PDCCH/PDSCH DMRS only exist when there is a true grant. It means PDCCH DMRS and PDSCH DMRS contains grant information. Comparing with legacy method which purely relies on PDCCH data-subcarriers, the proposed method does not degrade PDCCH decoding sensitivity while can significantly reduce false positive grant rate in UE modem, resulting in improved link robustness and less power consumption. In addition, since the PDCCH DMRS measurement and the PDSCH DMRS measurement can be derived from parameter estimations which are required for channel estimation anyhow, the proposed method is very cheap to be implemented in the modem baseband product of a UE without increasing the baseband processing complexity.

In LTE system, repeated PDSCH grants, which have same PDSCH allocation across different sub-frames, are frequently observed, although those sub-frames are not explicitly indicated from eNB to UE as semi-persistent scheduled sub-frames. In order to achieve earlier start of PDSCH channel estimation tasks without waiting for PDCCH decoding to be finished, it's desired to blindly detect repeated PDSCH grants. However, it's very difficult to accurately blindly detect such repeated PDSCH grants in LTE system, because the reference signals of PDSCH are cell-specific and are not correlated with PDSCH grant information, so they could not be explored for repeated PDSCH grant detection.

Other than the LTE system, in 5G NR system, the reference signal of PDSCH (e.g., PDSCH DMRS) is always specific to UE but not cell, so the PDSCH DMRS is always associated with a PDSCH grant. By blindly measuring and evaluating a hypothetical DMRS associated with a hypothetically repeated PDSCH grant in slot n, i.e., filtering the hypothetical DMRS in slot n, wherein the hypothetical DMRS in slot n has the same frequency allocation, time allocation, and consistent de-scrambling configuration with the PDSCH DMRS in slot n-1, the availability of repeated PDSCH grant can be detected. Thus a novel proposal is provided to detect repeated PDSCH grant based on PDSCH DMRS. The proposal will be discussed in details below.

Figure 3:
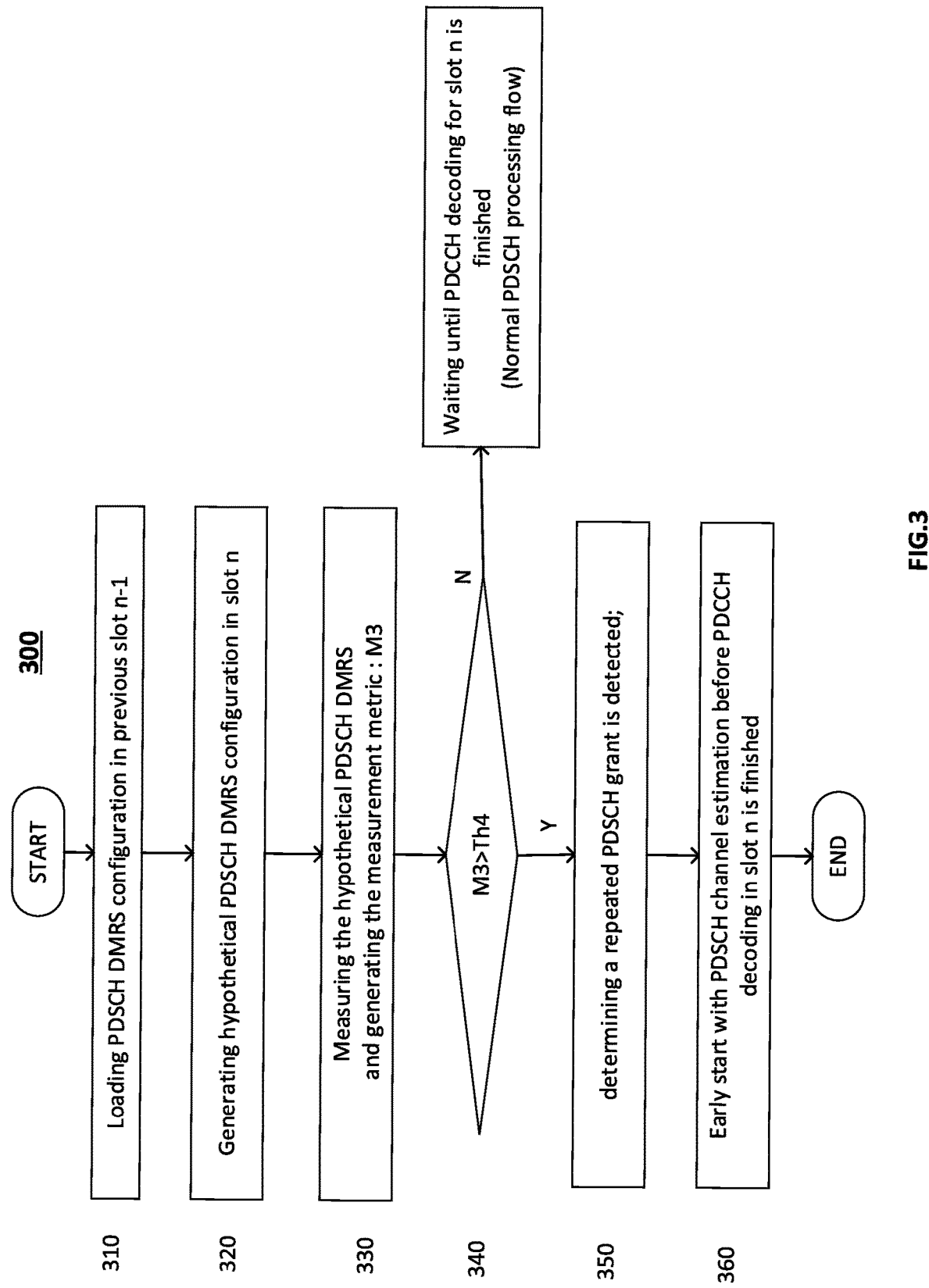
FIG. 3 illustrates a flow chart of a method for detection of repeated PDSCH grant based on PDSCH DMRS in accordance with some aspects of the disclosure.

FIG. 3 illustrates a flow chart of a method 300 for detection of repeated PDSCH grant based on PDSCH DMRS in accordance with some aspects of the disclosure. The method 300 may be applied to or performed by a UE, for example, UE 101 of FIG. 1.

The method 300 may include, at 310, obtaining configuration information of a received PDSCH DMRS associated with a PDSCH grant in a previous slot n-1. The configuration information may include frequency allocation, time allocation, and de-scrambling information of the PDSCH DMRS, etc.

At 320, a hypothetical PDSCH DMRS in current slot n may be generated based on the obtained configuration information of the received PDSCH DMRS in the previous slot n-1. An assumption is made here that all relevant configurations of DMRS remain the same across slots. Trial demodulation of the first DMRS symbol for the current slot n starts directly after receiving the corresponding OFDM symbol, without waiting for the decoding of the grant. In an aspect of the disclosure, the hypothetical PDSCH DMRS in current slot n has the same frequency/time allocation and a consistent DMRS descrambling seed with the PDSCH DMRS in the previous slot n-1.

At 330, a third measurement metric M3 may be computed by the UE (e.g., UE 101) based on the hypothetical PDSCH DMRS. In an aspect of the disclosure, M3 is computed based on full
symbols of the received PDSCH DMRS in slot n-1. In another aspect of the disclosure, M3 is computed based on a subset of symbols of the received PDSCH DMRS in slot n-1.

In an aspect of the disclosure, M3 is the same as M2, it can also be the post filtering DMRS
Signal-Noise Ratio (SNR), computed as:

$$M_3 = 10\log\frac{\sum_{1}^{nRefSym}\|(\hat{H})\|^2}{\sum_{1}^{nRefSym}\|(H-\hat{H})\|^2} \quad (3)$$

where $\hat{H}$ stands for frequency-time filtered demodulated PDSCH DMRS and H stands for unfiltered demodulated PDSCH DMRS.

According to some aspect of the disclosure, the third measurement metric M3 may be a scalar product based metric or a time offset estimation metric, etc.

The method 300 may further include, at 340, comparing M3 with a fourth threshold TH4 TH4 TH4and determining a repeated PDSCH grant is detected in the current slot n when the third measurement metric M3 is larger than the fourth threshold TH4 TH4(M3>TH4) at 350. If M<=TH4, then the assumption for repeated PDSCH grant is claimed as failure and the UE need to wait for the PDCCH decoding as in normal procedure.

In an aspect of the disclosure, TH4 TH4may be dynamically determined by an aggregation level of
PDCCH channel, the number of UE receiver antennas and the number of allocated resource blocks (RBs) in the PDSCH grant. In an aspect of the disclosure, TH4 TH4may increase with the increase of the aggregation level of PDCCH channel, the number of UE receiver antennas or the number of allocated RBs in the PDSCH grant, specifically, the higher the aggregation level, the larger the number of receive antennas or the larger the number of allocated RBs, the bigger the TH4.

As an example, when the number of the UE receiver antennas is 4, and the aggregation level of PDCCH channel is 2 CCEs, and the number of allocated RB is 15, TH4 TH4may be −2 dB.

When the detection succeeds, PDSCH channel estimation can be early started without waiting PDCCH decoding in the current slot n to be finished, as shown at 360. Furthermore, consider that in 5G NR, PDSCH and PDCCH are usually from different DL TX beams from different Transmission-Reception Points (TRPs) in a gNB, it may happen that UE fails decoding PDCCH (in case of bad DL TX PDCCH beams) while still the granted PDSCH in good channel quality (good DL TX PDSCH beams). In this case, the blind detection will make sure UE can still decode the PDSCH to avoid DL throughput drop.

Figure 4:
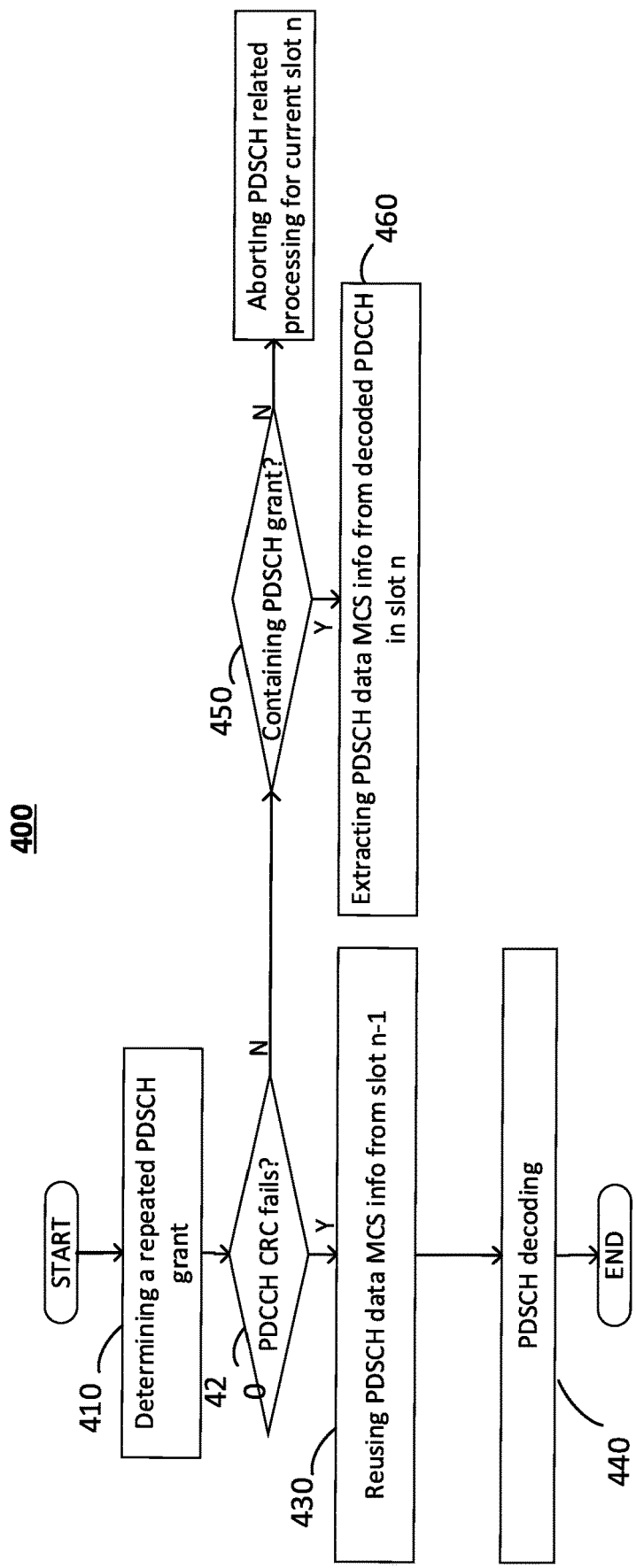
FIG. 4 illustrates a flow chart of a method for decoding PDSCH based on the repeated PDSCH grant in accordance with some aspects of the disclosure.

FIG. 4 illustrates a flow chart of a method 400 for decoding PDSCH based on the repeated PDSCH grant in accordance with some aspects of the disclosure. The method 400 may be applied to or performed by a UE, for example, UE 101 of FIG. 1.

The method 400 may include, when a repeated PDSCH grant is detected in the current slot n (e.g., based on the method 300 of FIG. 3), obtaining the result of a Cyclic Redundancy Check (CRC) for the PDCCH in the current slot n, as shown at 410 and 420.

when PDCCH CRC fails but a high M3 (e.g., larger than TH4) is detected, which shows confidence of a repeated PDSCH grant, it indicates that PDCCH decoding fails due to very weak PDCCH beam but PDSCH beam is still strong. In this case, the Modulation and Coding Scheme (MCS) information of the previous slot n−1 may be used to decode the PDSCH in the current slot n, due to fully repeated PDSCH grant with same MCS. It should be noted that the true MCS of the current slot n may be different from that of slot n−1, which will be indicated by the failure of PDSCH CRC. Thus the procedure may continue with retrieving the MCS information from the previous slot n−1 when the PDCCH CRC fails at 430, and decoding the PDSCH in the current slot n by reusing the MCS information from the previous slot n−1 at 440.

If PDCCH CRC passes but no PDSCH grant is found in the decoded PDCCH in the current slot n, it means the PDSCH DMRS based detection is false alarm (this is at very low probability), the UE may abort the early channel estimation. If it' determined that PDCCH CRS passes and a PDSCH grant is detected in the decoded PDCCH in the current slot n at 450, the UE may extract the MCS information from the grant in the decoded PDCCH at 460 and decode the PDSCH using the extracted MCS. In addition, The UE may do a confirmation check against our reused parameters.

The proposed methods for detection of a repeated PDSCH grant and decoding PDSCH based on the repeated PDSCH grant can be very beneficial. In an aspect of the disclosure, a more complex PDSCH channel estimation algorithm with better estimation accuracy can be opportunistically enabled to improve channel estimation accuracy. In another aspect of the disclosure, PDSCH grant dependent DVFS can be activated earlier so that more dynamical power can be reduced. In addition, the proposed methods can also be used to avoid DL throughput drop due to poor PDCCH channel quality.

For repeated PDSCH grants, because their DMRS are occupying the same time/frequency resource element within different slots, it is very beneficial to apply cross-slot channel estimation filtering (e.g. IIR filtering or Karlman filtering), which helps significantly improves the channel estimation accuracy. However, due to the beamforming in 5G NR, especially in 5G NR mmWave communications, the DL TX beam from the gNB to UE may vary from slot to slot. In current NR standard, the network is not explicitly indicating UE about whether DL TX beam is kept the same or not when crossing different slots. As a consequence, cross-slot channel estimation filtering is risky even DMRS is repeated in the same allocation cross different slots. That is because when DL TX beam is significantly different across slots, cross-slot channel estimation filtering will significantly lose the accuracy. Therefore, in order to apply cross-slot channel estimation filtering for repeated PDSCH grants, there is a need to detect cross-slot beam continuity.

A novel proposal is provided to detect cross-slot DMRS phase continuity between continuous slots. The detection is done by computing mean square error (MSE) between the frequency domain filtered PDSCH DMRS channel estimates in slot (n), and the extrapolated PDSCH DMRS channel estimates from slot (n−1). When the detection succeeds, cross-slot channel estimation filtering is enabled to improve channel estimation accuracy, otherwise it is disabled. The proposal will be discussed in details below.

Figure 5:
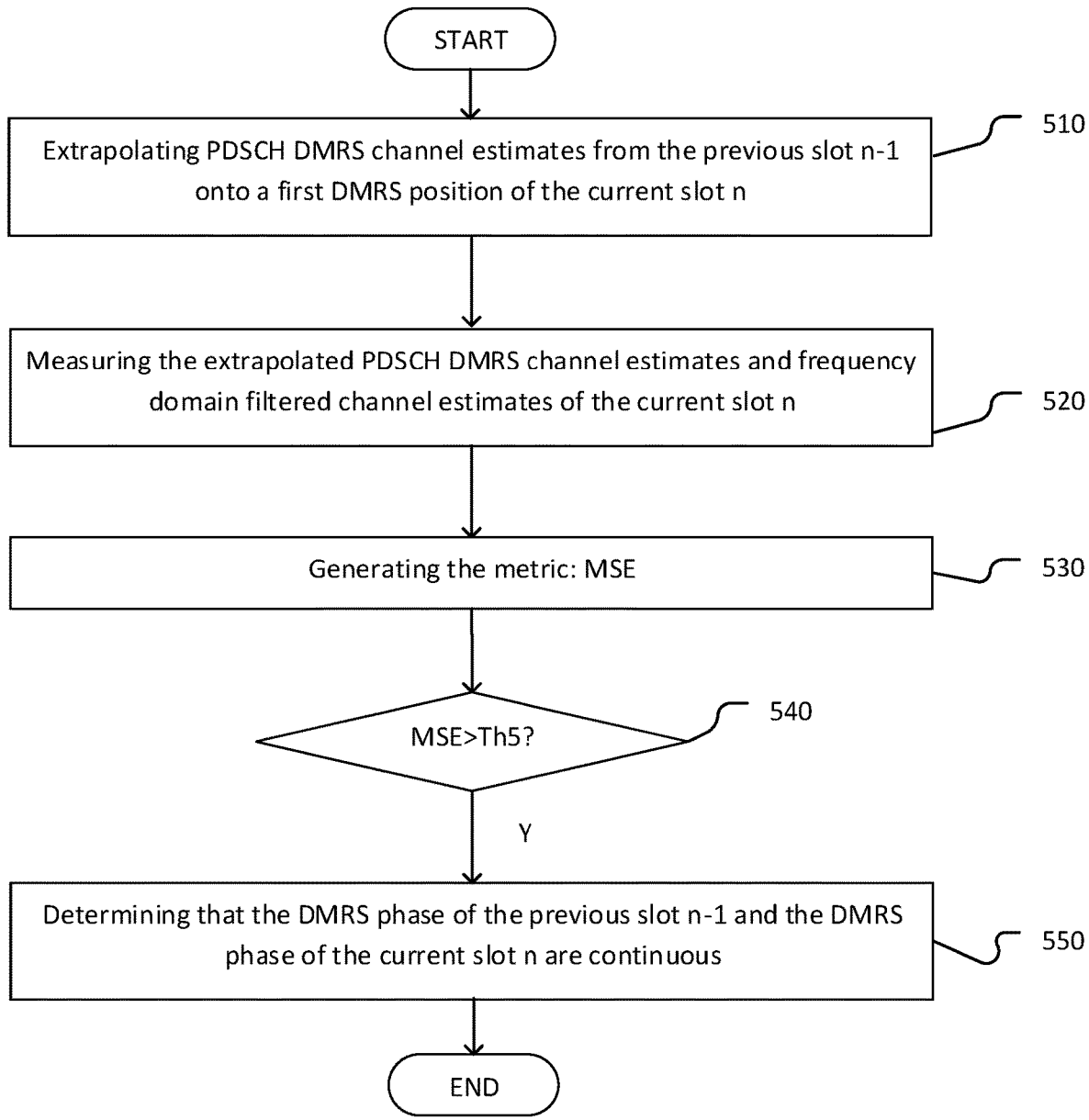
FIG. 5 illustrates a flow chart of a method for detection of cross-slot DL TX beam continuity for repeated PDSCH grants in accordance with some aspects of the disclosure.

FIG. 5 illustrates a flow chart of a method 500 for detecting cross-slot DMRS phase continuity for repeated PDSCH grants in accordance with some aspects of the disclosure, which may be applied to or performed by a UE, for example, UE 101 of FIG. 1. The method 500 may be performed in combination with the method 400 or be performed separately.

Figure 6:
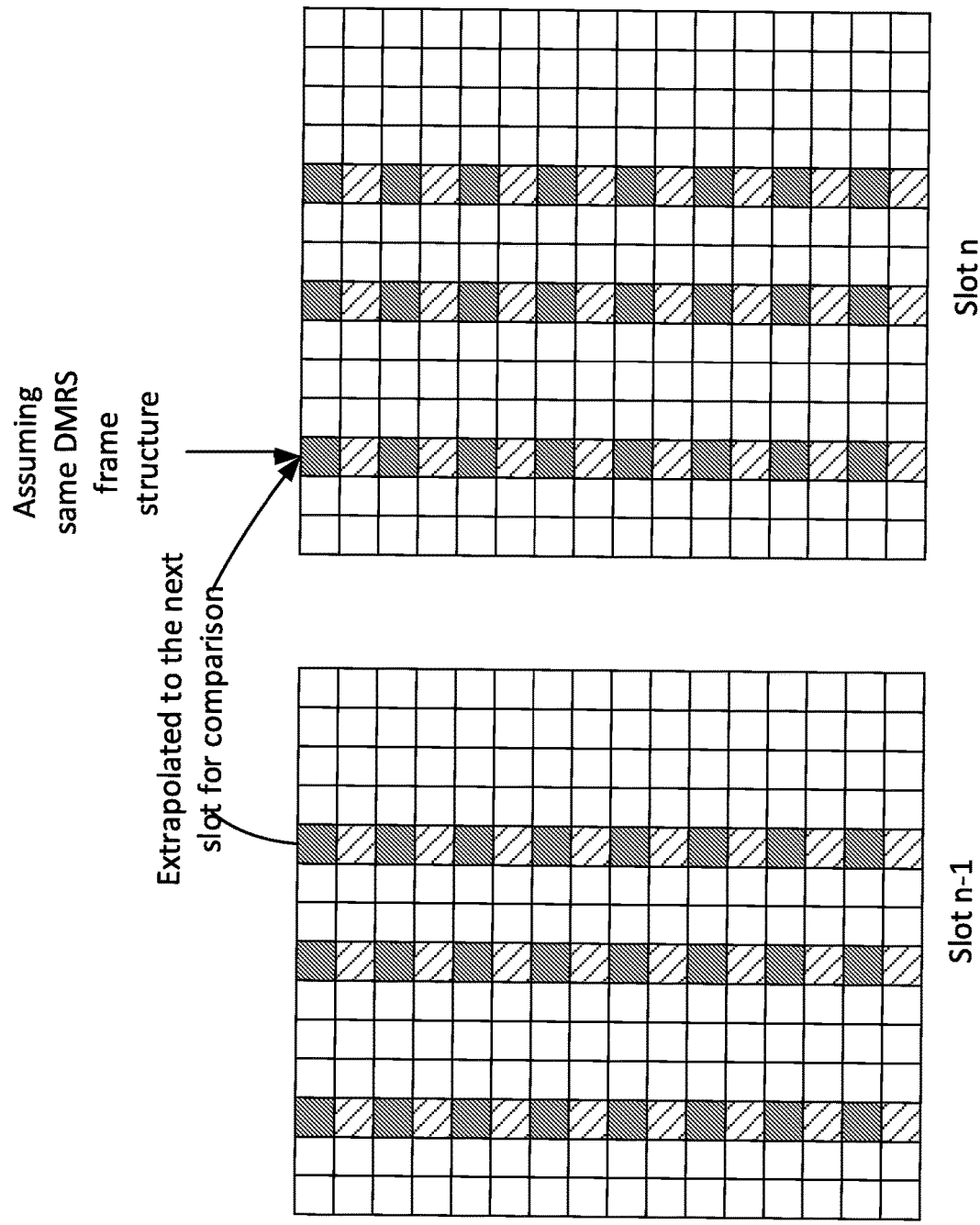
FIG. 6 illustrates a possible PDSCH DMRS allocation pattern and the extrapolation of the PDSCH DMRS from slot n−1 to slot n.

The method 500 may include, at 510, extrapolating PDSCH DMRS channel estimates from the previous slot n−1 onto a first DMRS position of the current slot n, as shown in FIG. 6. FIG. 6 illustrates a possible PDSCH DMRS allocation pattern and an extrapolation of the PDSCH DMRS from slot n−1 onto slot n, wherein the following scenario is assumed: UE has continuous data allocated for a certain period. As shown in FIG. 6, for beam continuity detection in slot n, an extrapolation of the DMRS from slot n−1 onto the DMRS position of slot n has to be done in addition.

The method 500 may further include, at 520, measuring the extrapolated PDSCH DMRS channel estimates based on the received PDSCH DMRS in the previous slot n−1 and frequency domain filtered channel estimates of the current slot n based on the received PDSCH DMRS in the current slot n. And then the MSE metric is computed based on the extrapolated PDSCH DMRS channel estimates and the frequency domain filtered channel estimates of the current slot n at 530. In an aspect of the disclosure, The MSE metric can be computed as:

$$MSE = \frac{\|\overline{H}_{n,1} - F\hat{H}_{n-1 \to n}\|^2}{\|\hat{H}_{n-1 \to n}\|^2} \quad (4)$$

where $\hat{H}_{n-1 \to n}$ represents the extrapolated PDSCH DMRS channel estimates, $\overline{H}_{n,1}$ represents the frequency domain filtered channel estimates of the current slot n associated with DMRS symbol 1, and F represents a compensation of time/frequency offset as well as Automatic Gain Control (AGC) change applied at a slot boundary between the previous slot n−1 and the current slot n.

Note that the channel MSE metric between two slots which is used for cross-slot DL TX beam continuity detection, can also be used for repeated PDSCH grant detection e.g., as shown in FIG. 3. As a result, no extra DMRS based measurement is required which saves MIPS.

The computed MSE may be compared with a fifth threshold TH5 at 540. Based on the result of the comparison, the UE can determine the cross-slot DMRS phase continuity between the previous slot n−1 and the current slot n. In an aspect of the disclosure, if the MSE metric is larger than TH5, then the flag of beam continuity can be set to be 1. If not, then the continuity is regarded as invalid.

In an aspect of the disclosure, the threshold TH5 has to be defined such that the false positive rate is very low. TH5 may be dynamically determined by the number of UE receiver antennas and the number of allocated resource blocks (RBs) in the PDSCH grant, and the threshold TH5 may decrease with the increase of the number of UE receiver antennas or the number of allocated RBs in a PDSCH grant, specifically, the higher the number of UE receiver antennas or the bigger the number of allocated RBs, the smaller the threshold TH5 is.

As an example, when the number of the UE receiver antennas is 4, and the number of allocated RB is 15, TH5 may be 0.3.

When the DMRS phase of the previous slot n−1 and the DMRS phase of the current slot n are detected to be continuous, the cross-slot channel estimation filtering (e.g. IIR filtering or Karlman filtering) may be applied, which helps significantly improves the channel estimation accuracy. For example, the PDSCH channel estimation in slot n may be performed based on the received PDSCH DMRS in slot n−1 and the received PDSCH DMRS in slot n for performance boost.

In an aspect of the disclosure, the thresholds discussed herein, for example, TH1, TH2, TH3, TH4,
and TH5, may be derived in principle by performance simulation and may be put into a look-up table. UE may retrieve the corresponding threshold from the look-up table to perform the proposed methods.

Figure 7:
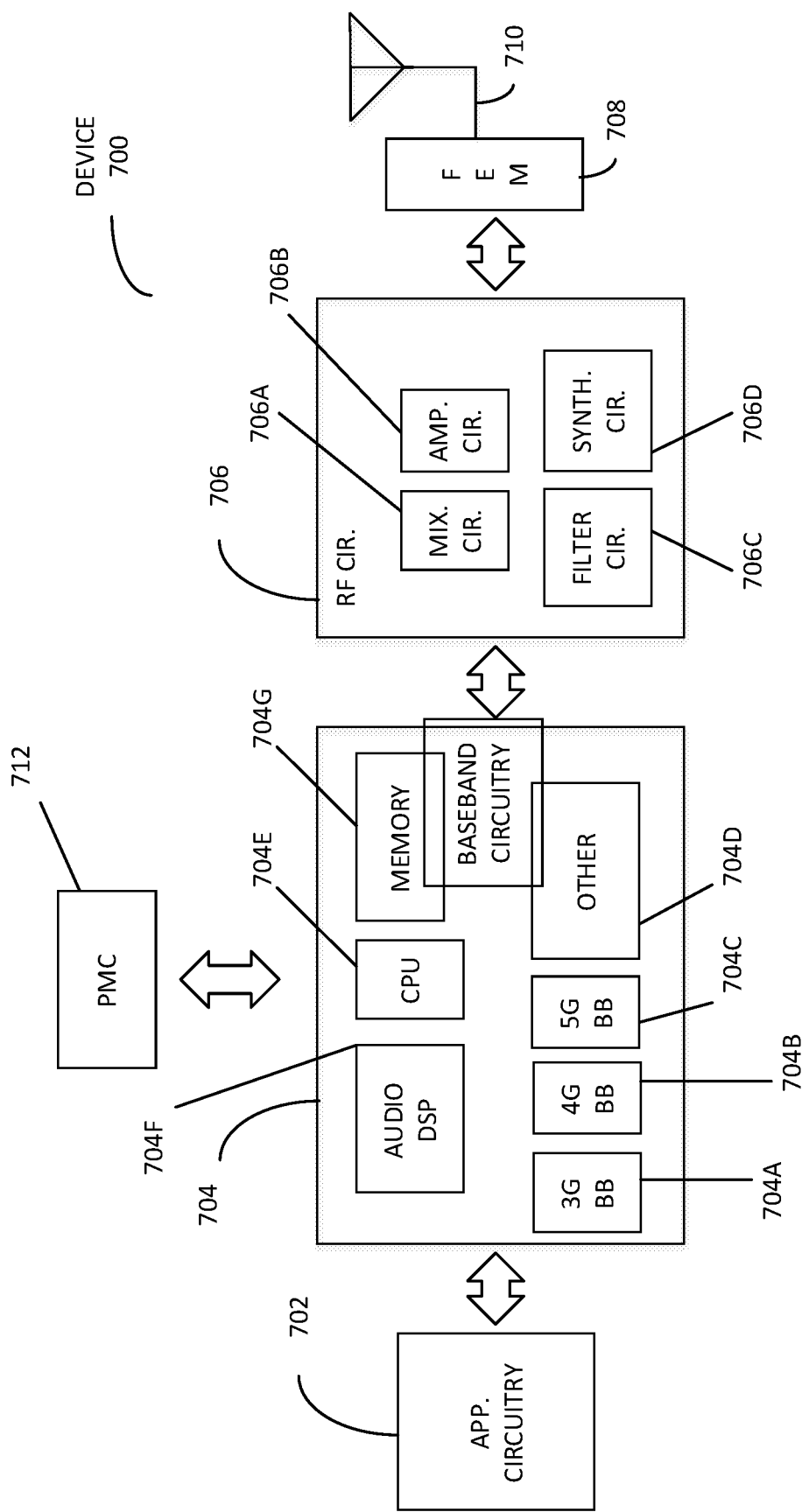
FIG. 7 illustrates example components of a device in accordance with some aspects of the disclosure.

FIG. 7 illustrates example components of a device 700 in accordance with some aspects. According to some aspect of the disclosure, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE. According to some aspect of the disclosure, the device 700 may include less elements. According to some aspect of the disclosure, the device 700 may include additional elements such as, for example, memory/storage, display, camera, sensor, or input/output (I/O) interface. In other aspects, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. According to some aspect of the disclosure, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, According to some aspect of the disclosure, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), si7h generation (6G), etc.). The baseband circuitry 704 (e.g., one or more of baseband processors 704A-D) may handle various radio control functions that enable communication with one or more radio networks via the RF circuitry 706. In other aspects, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. According to some aspect of the disclosure, modulation/demodulation circuitry of the baseband circuitry 704 may include Fast-Fourier Transform (FFT), precoding, or constellation mapping/demapping functionality. According to some aspect of the disclosure, encoding/decoding circuitry of the baseband circuitry 704 may include convolution, tail-biting convolution, turbo, Viterbi, or Low Density Parity Check (LDPC) encoder/decoder functionality. Aspects of modulation/demodulation and encoder/decoder functionality are not limited to these examples and may include other suitable functionality in other aspects.

According to some aspect of the disclosure, the baseband circuitry 704 may include one or more audio digital signal processor(s) (DSP) 704F. The audio DSP(s) 704F may be include elements for compression/decompression and echo cancellation and may include other suitable processing elements in other aspects. Components of the baseband circuitry may be suitably combined in a single chip, a single chipset, or disposed on a same circuit board in some aspects. According to some aspect of the disclosure, some or all of the constituent components of the baseband circuitry 704 and the application circuitry 702 may be implemented together such as, for example, on a system on a chip (SOC).

According to some aspect of the disclosure, the baseband circuitry 704 may provide for communication compatible with one or more radio technologies. For example, According to some aspect of the disclosure, the baseband circuitry 704 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various aspects, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

According to some aspect of the disclosure, the receive signal path of the RF circuitry 706 may include mixer circuitry 706a, amplifier circuitry 706b and filter circuitry 706c. According to some aspect of the disclosure,
the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. According to some aspect of the disclosure, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. According to some aspect of the disclosure, the output baseband signals may be zero-frequency baseband signals, although this is not a requirement. According to some aspect of the disclosure, mixer circuitry 706a of the receive signal path may include passive mixers, although the scope of the aspects of the disclosure is not limited in this respect.

According to some aspect of the disclosure, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

According to some aspect of the disclosure, the mixer circuitry 706a of the receive signal path and the mixer circuitry 706a of the transmit signal path may include two or more mixers and may be arranged for quadrature downconversion and upconversion, respectively. According to some aspect of the disclosure, the mixer circuitry 706a of the receive signal path and the mixer circuitry 706a of the transmit signal path may include two or more mixers and may be arranged for image rejection (e.g., Hartley image rejection). According to some aspect of the disclosure, the mixer circuitry 706a of the receive signal path and the mixer circuitry 706a may be arranged for direct downconversion and direct upconversion, respectively. According to some aspect of the disclosure, the mixer circuitry 706a of the receive signal path and the mixer circuitry 706a of the transmit signal path may be configured for super-heterodyne operation.

According to some aspect of the disclosure, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode aspects, a separate radio IC circuitry may be provided for processing signals for each spectrum, although the scope of the aspects is not limited in this respect.

According to some aspect of the disclosure, the synthesizer circuitry 706d may be a fractional-N synthesizer or a fractional N/N+1 synthesizer, although the scope of the aspects is not limited in this respect as other types of frequency synthesizers may be suitable. For example, synthesizer circuitry 706d may be a delta-sigma synthesizer, a frequency multiplier, or a synthesizer including a phase-locked loop with a frequency divider.

The synthesizer circuitry 706d may be configured to synthesize an output frequency for use by the mixer circuitry 706a of the RF circuitry 706 based on a frequency input and a divider control input. According to some aspect of the disclosure, the synthesizer circuitry 706d may be a fractional N/N+1 synthesizer.

According to some aspect of the disclosure, frequency input may be provided by a voltage controlled oscillator (VCO), although that is not a requirement. Divider control input may be provided by either the baseband circuitry 704 or the applications processor 702 depending on the desired output frequency. According to some aspect of the disclosure, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. According to some aspect of the disclosure, the divider may be a dual modulus divider (DMD) and the phase accumulator may be a digital phase accumulator (DPA). According to some aspect of the disclosure, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

According to some aspect of the disclosure, synthesizer circuitry 706d may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. According to some aspect of the disclosure, the output frequency may be a LO frequency (fLO). According to some aspect of the disclosure, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various aspects, the amplification through the transmit or receive signal paths may be done solely in the RF circuitry 706, solely in the FEM 708, or in both the RF circuitry 706 and the FEM 708.

According to some aspect of the disclosure, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

According to some aspect of the disclosure, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other aspects, the PMC 712 may be additionally or alternatively coupled with, and perform similar power management operations for, other components such as, but not limited to, application circuitry 702, RF circuitry 706, or FEM 708.

According to some aspect of the disclosure, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 8:
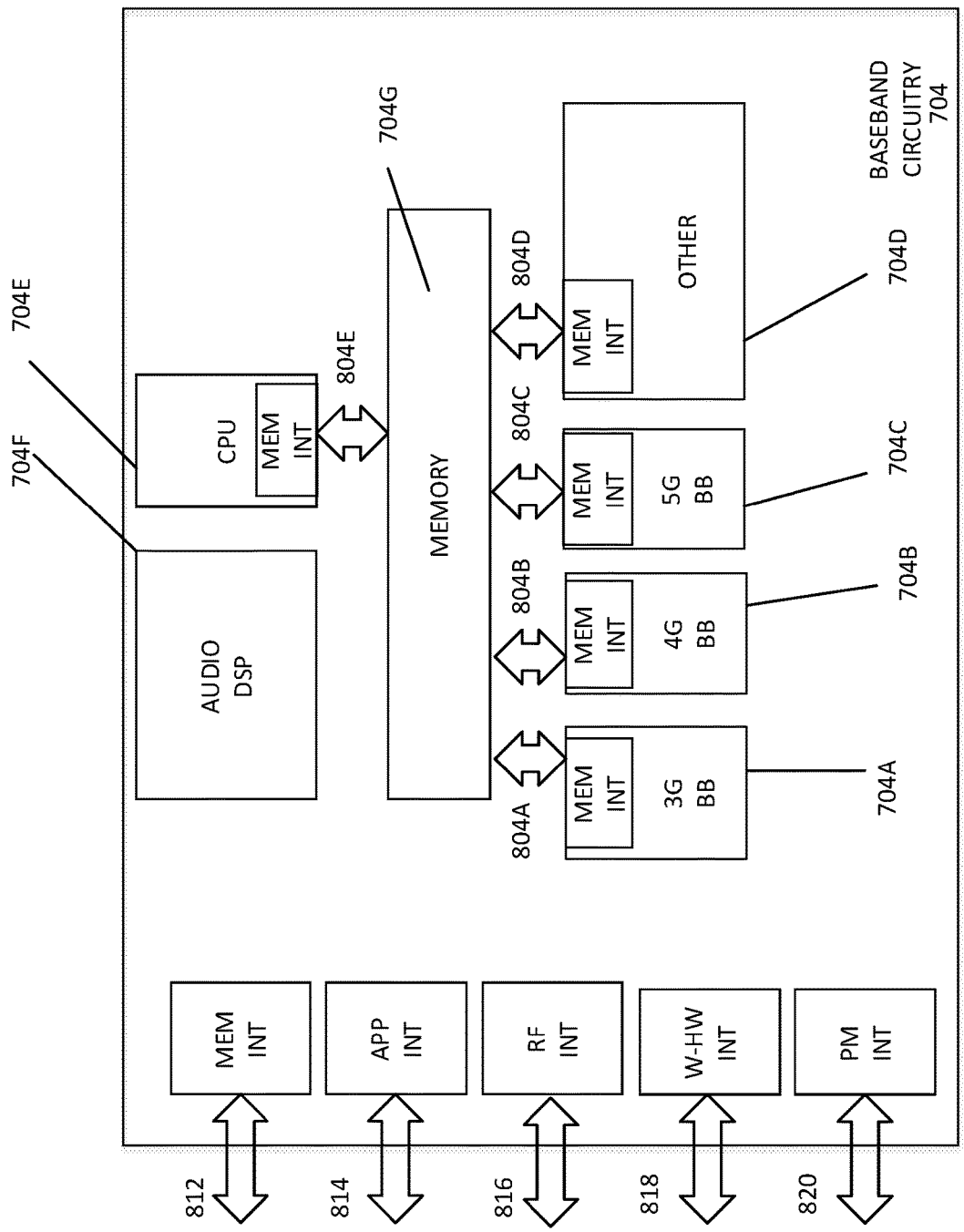
FIG. 8 illustrates example interfaces of baseband circuitry in accordance with some aspects of the disclosure.

FIG. 8 illustrates example interfaces of baseband circuitry in accordance with some aspects. As discussed above, the baseband circuitry 704 of FIG. 7 may include processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
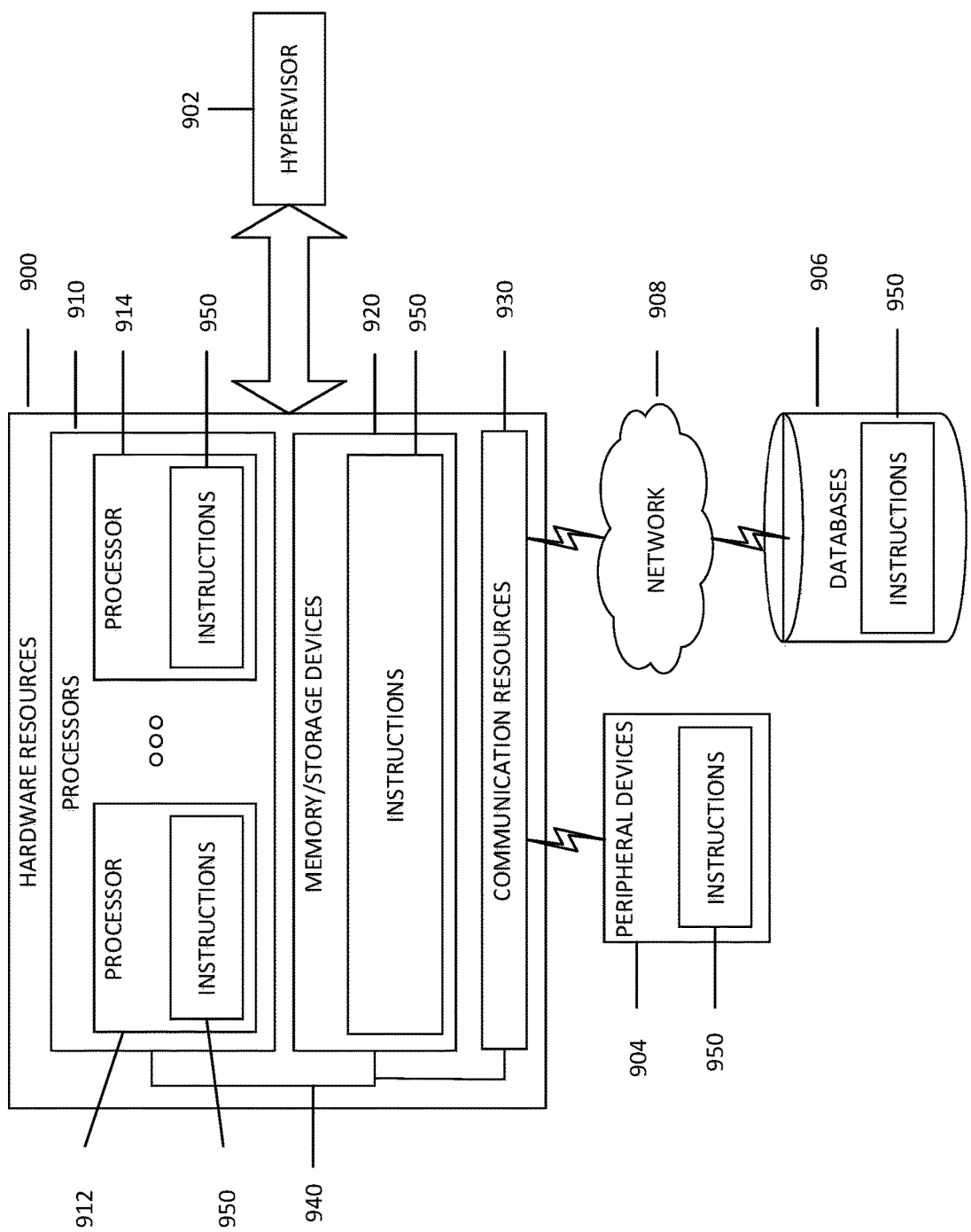
FIG. 9 is a block diagram illustrating components, according to some example aspects of the disclosure, able to read instructions from a machine-readable or computer-readable medium and perform any one or more of the methodologies discussed herein.

FIG. 9 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For aspects where node virtualization (e.g., NFV) is utilized, a hypervisor 902 may be executed to provide an execution environment for one or more network slices/sub-slices to utilize the hardware resources 900.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may include software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

The following paragraphs describe examples of various aspects.

Example 1 includes an apparatus for a User Equipment (UE), including circuitry configured to: measure a UE-specific Demodulation Reference Signal (DMRS) associated with a Physical Downlink Control Channel (PDCCH); compute a first measurement metric M1 based on the UE-specific DMRS associated with the PDCCH before decoding the PDCCH; decode the PDCCH based on the first measurement metric M1; and decode a Physical Downlink Shared Channel (PDSCH) based on the decoded PDCCH.

Example 2 includes the apparatus of Example 1, wherein when the first metric M1 is not smaller than the first threshold TH1 (M1>=TH1), the PDCCH is decoded.

Example 3 includes the apparatus of Example 1, wherein the circuitry is further configured to: obtain a PDSCH grant associated with the PDSCH from the decoded PDCCH; measure the UE-specific DMRS associated with the PDSCH grant; compute a second measurement metric M2 based on the UE-specific DMRS associated with the PDSCH grant; determine whether the PDSCH grant is valid or not based on the first measurement metric M1 and the second measurement metric M2; and decode the PDSCH when the PDSCH grant is valid.

Example 4 includes the apparatus of Example 3, wherein the circuitry is further configured to: compare the sum (M1+M2) of the first measurement metric M1 and the second measurement metric M2 with a second threshold TH2; and determine the PDSCH grant is valid when the sum (M1+M2) is larger than the second threshold (M1+M2>TH2).

Example 5 includes the apparatus of Example 3, compare the sum (M1+M2) of the first measurement metric M1 and the second measurement metric M2 with a second threshold TH2; compare the difference (M2-M1) between the second measurement metric M2 and the first measurement metric M1 with a third threshold TH3; and determine the PDSCH grant is valid when the sum (M1+M2) is larger than the second threshold TH2 and the difference (M2-M1) is larger than the third threshold TH3 (M1+M2>TH2 and M2-M1>TH3).

Example 6 includes the apparatus of any of Examples 1-5, wherein the first threshold TH1 is dynamically determined based on an aggregation level of PDCCH channel and the number of UE receiver antennas.

Example 7 includes the apparatus of Example 6, wherein the first threshold TH1 increases with the increase of the aggregation level of PDCCH channel or the number of UE receiver antennas.

Example 8 includes the apparatus of any of Examples 4-5, wherein the second threshold TH2 is dynamically determined based on an aggregation level of PDCCH channel, the number of UE receiver antennas and the number of allocated resource blocks (RBs) in the PDSCH grant.

Example 9 includes the apparatus of Example 8, wherein the second threshold TH2 increases with the increase of the aggregation level of PDCCH channel, the number of UE receiver antennas or the number of allocated RBs in the PDSCH grant.

Example 10 includes the apparatus of Example 5, wherein the third threshold TH3 is dynamically determined based on the number of allocated resource blocks (RBs) in the PDSCH grant.

Example 11 includes the apparatus of Example 10, wherein the third threshold TH3 increases with the increase of the number of allocated RBs in the PDSCH grant.

Example 12 includes the apparatus of any of Examples 1-11, wherein the first measurement metric M1 and the second measurement metric M2 are signal-to-noise ratio (SNR).

Example 13 includes an apparatus for a User Equipment (UE), including circuitry configured to: obtain configuration information of a received UE-specific Physical Downlink Shared Channel (PDSCH) Demodulation Reference Signal (DMRS) associated with a PDSCH grant in a previous slot n−1; generate a hypothetical UE-specific PDSCH DMRS in current slot n based on the obtained configuration information of the received UE-specific PDSCH DMRS in the previous slot n−1; compute a third measurement metric M3 based on the hypothetical UE-specific PDSCH DMRS; compare the third measurement metric M3 with a fourth threshold TH4; determine a repeated PDSCH grant is detected in the current slot n when the third measurement metric M3 is larger than the fourth threshold TH4 TH4 (M3>TH4); and decode the PDSCH in the current slot n based on the detected PDSCH grant.

Example 14 includes the apparatus of Example 13, wherein the circuitry is further configured to: perform PDSCH channel estimation in advance based on the hypothetical UE-specific PDSCH DMRS before finishing decoding of the PDCCH in the current slot n; and decode the PDSCH in the current slot n based on the detected PDSCH grant.

Example 15 includes the apparatus of Example 13 or 14, wherein the circuitry is further configured to: obtain a result of a Cyclic Redundancy Check (CRC) for the PDCCH in the current slot n when the repeated PDSCH grant is detected in the current slot n; retrieve, when the CRC fails, Modulation and Coding Scheme (MCS) information from the previous slot n−1; and decode the PDSCH in the current slot n by reusing the MCS information from the previous slot n−1.

Example 16 includes the apparatus of Example 13 or 14, obtain a result of a Cyclic Redundancy Check (CRC) for the PDCCH in the current slot n when the repeated PDSCH grant is detected in the current slot n; determine, when the CRC succeeds, if a PDSCH grant is included in the decoded PDCCH in the current slot n; extract MCS information from the decoded PDCCH in the current slot n when the PDSCH grant is included in the decoded PDCCH; and decode the PDSCH in the current slot n by using the MCS information from the decoded PDCCH in the current slot n.

Example 17 includes the apparatus of any of Examples 13-16, wherein the fourth threshold TH4 TH4is dynamically determined by an aggregation level of PDCCH channel, the number of UE receiver antennas and the number of allocated resource blocks (RBs) in the PDSCH grant.

Example 18 includes the apparatus of Example 17, wherein the fourth threshold TH4 TH4increases with the increase of the aggregation level of PDCCH channel, the number of UE receiver antennas or the number of allocated RBs in the PDSCH grant.

Example 19 includes the apparatus of any of Example 13-18, wherein the third measurement metric M3 is signal-to-noise ratio (SNR).

Example 20 includes the apparatus of any of Examples 13-19, wherein the hypothetical UE-specific PDSCH DMRS in current slot n has the same frequency/time allocation and consistent DMRS descrambling configuration with the UE-specific PDSCH DMRS in the previous slot n−1.

Example 21 includes an apparatus for a User Equipment (UE), including circuitry configured to: extrapolate PDSCH DMRS channel estimates from a previous slot n−1 onto a first DMRS position of a current slot n; measure the extrapolated PDSCH DMRS channel estimates based on the a received PDSCH DMRS in the previous slot n−1 and frequency domain filtered channel estimates of the current slot n based on a received PDSCH DMRS in the current slot n; compute Mean Square Error (MSE) based on the extrapolated channel estimates and the frequency domain filtered channel estimates of the current slot n; compare the MSE with a fifth threshold TH5; determine cross-slot DMRS phase continuity between the previous slot n−1 and the current slot n based on the result of the comparison; and perform cross-slot PDSCH channel estimation based on the cross-slot DMRS phase continuity between the previous slot n−1 and the current slot n.

Example 22 includes the apparatus of Example 21, wherein the MSE is computed as:

$$MSE = \frac{\|\overline{H}_{n,1} - F\hat{H}_{n-1\to n}\|^2}{\|\hat{H}_{n-1\to n}\|^2}$$

where $\hat{H}_{n-1\to n}$ represents the extrapolated PDSCH DMRS channel estimates, $\overline{H}_{n,1}$ represents the frequency domain filtered channel estimates of the current slot n associated with DMRS symbol 1, and F represents a compensation of time/frequency offset as well as Automatic Gain Control (AGC) change applied at a slot boundary between the previous slot n−1 and the current slot n.

Example 23 includes the apparatus of Example 21, when the MSE is larger than the fifth threshold TH5 (MSE>TH5), the DMRS phase of the previous slot n−1 and the DMRS phase of the current slot n are determined to be continuous.

Example 24 includes the apparatus of Example 21, wherein the circuitry is further configured to: perform, when the DMRS phase of the previous slot n−1 and the DMRS phase of the current slot n are determined to be continuous, the PDSCH channel estimation in slot n based on the received UE-Specific PDSCH DMRS in slot n−1 and the received UE-specific PDSCH DMRS in slot n.

Example 25 includes the apparatus of any of Examples 22-24, wherein the fifth threshold TH5 is dynamically determined by the number of UE receiver antennas and the number of allocated resource blocks (RBs) in a PDSCH grant.

Example 26 includes the apparatus of Example 25, wherein the threshold TH5 decreases with the increase of the number of UE receiver antennas or the number of allocated RBs in a PDSCH grant.

Example 27 includes a method performed at a User Equipment (UE), including: measuring a UE-specific Demodulation Reference Signal (DMRS) associated with a Physical Downlink Control Channel (PDCCH); computing a first measurement metric M1 based on the UE-specific DMRS associated with the PDCCH before decoding the PDCCH; decoding the PDCCH based on the first measurement metric M1; and decoding a Physical Downlink Shared Channel (PDSCH) based on the decoded PDCCH.

Example 28 includes the method of Example 27, wherein when the first metric M1 is not smaller than the first threshold TH1 (M1>=TH1), the PDCCH is decoded.

Example 29 includes the method of Example 27, wherein decoding the PDSCH based on the decoded PDCCH further including: obtaining a PDSCH grant associated with the PDSCH from the decoded PDCCH; measuring the UE-specific DMRS associated with the PDSCH grant; computing a second measurement metric M2 based on the UE-specific DMRS associated with the PDSCH grant; determining whether the PDSCH grant is valid or not based on the first measurement metric M1 and the second measurement metric M2; and decoding the PDSCH when the PDSCH grant is valid.

Example 30 includes the method of Example 29, wherein determining whether the PDSCH grant is valid or not based on the first measurement metric M1 and the second measurement metric M2 further including: comparing the sum (M1+M2) of the first measurement metric M1 and the second measurement metric M2 with a second threshold TH2; and determining the PDSCH grant is valid when the sum (M1+M2) is larger than the second threshold (M1+M2>TH2).

Example 31 includes the method of Example 29, determining whether the PDSCH grant is valid or not based on the first measurement metric M1 and the second measurement metric M2 further including: comparing the sum (M1+M2) of the first measurement metric M1 and the second measurement metric M2 with a second threshold TH2; comparing the difference (M2−M1) between the second measurement metric M2 and the first measurement metric M1 with a third threshold TH3; and determining the PDSCH grant is valid when the sum (M1+M2) is larger than the second threshold TH2 and the difference (M2−M1) is larger than the third threshold TH3 (M1+M2>TH2 and M2−M1>TH3).

Example 32 includes the method of any of Examples 27-31, wherein the first threshold TH1 is dynamically determined based on an aggregation level of PDCCH channel and the number of UE receiver antennas.

Example 33 includes the method of Example 32, wherein the first threshold TH1 increases with the increase of the aggregation level of PDCCH channel or the number of UE receiver antennas.

Example 34 includes the method of any of Examples 30-31, wherein the second threshold TH2 is dynamically determined based on an aggregation level of PDCCH channel, the number of UE receiver antennas and the number of allocated resource blocks (RBs) in the PDSCH grant.

Example 35 includes the method of Example 34, wherein the second threshold TH2 increases with the increase of the aggregation level of PDCCH channel, the number of UE receiver antennas or the number of allocated RBs in the PDSCH grant.

Example 36 includes the method of Example 31, wherein the third threshold TH3 is dynamically determined based on the number of allocated resource blocks (RBs) in the PDSCH grant.

Example 37 includes the method of Example 36, wherein the third threshold TH3 increases with the increase of the number of allocated RBs in the PDSCH grant.

Example 38 includes the method of any of Examples 27-37, wherein the first measurement metric M1 and the second measurement metric M2 are signal-to-noise ratio (SNR).

Example 39 includes a method performed at a User Equipment (UE), including: obtaining configuration information of a received UE-specific Physical Downlink Shared Channel (PDSCH) Demodulation Reference Signal (DMRS) associated with a PDSCH grant in a previous slot n−1; generating a hypothetical UE-specific PDSCH DMRS in current slot n based on the obtained configuration information of the received UE-specific PDSCH DMRS in the previous slot n−1; computing a third measurement metric M3 based on the hypothetical UE-specific PDSCH DMRS; comparing the third measurement metric M3 with a fourth threshold TH4; determining a repeated PDSCH grant is detected in the current slot n when the third measurement metric M3 is larger than the fourth threshold TH4 TH4 (M3>TH4); and decoding the PDSCH in the current slot n based on the detected PDSCH grant.

Example 40 includes the method of Example 39, wherein decoding the PDSCH in the current slot n based on the detected PDSCH grant further including: performing PDSCH channel estimation in advance based on the hypothetical UE-specific PDSCH DMRS before finishing decoding of the Physical Downlink Control Channel (PDCCH) in the current slot n; and decoding the PDSCH in the current slot n based on the detected PDSCH grant.

Example 41 includes the method of Example 39 or 40, wherein decoding the PDSCH in the current slot n based on the detected PDSCH grant further including: obtaining a result of a Cyclic Redundancy Check (CRC) for the PDCCH in the current slot n when the repeated PDSCH grant is detected in the current slot n; retrieving, when the CRC fails, Modulation and Coding Scheme (MCS) information from the previous slot n−1; and decoding the PDSCH in the current slot n by reusing the MCS information from the previous slot n−1.

Example 42 includes the method of Example 39 or 40, wherein decoding the PDSCH in the current slot n based on the detected PDSCH grant further including: obtaining a result of a Cyclic Redundancy Check (CRC) for the PDCCH in the current slot n when the repeated PDSCH grant is detected in the current slot n; determining, when the CRC succeeds, if a PDSCH grant is included in the decoded PDCCH in the current slot n; extracting MCS information from the decoded PDCCH in the current slot n when the PDSCH grant is included in the decoded PDCCH; and decoding the PDSCH in the current slot n by using the MCS information from the decoded PDCCH in the current slot n.

Example 43 includes the method of any of Examples 39-42, wherein the fourth threshold TH4 TH4is dynamically determined by an aggregation level of PDCCH channel, the number of UE receiver antennas and the number of allocated resource blocks (RBs) in the PDSCH grant.

Example 44 includes the method of Example 43, wherein the fourth threshold TH4 TH4increases with the increase of the aggregation level of PDCCH channel, the number of UE receiver antennas or the number of allocated RBs in the PDSCH grant.

Example 45 includes the method of any of Examples 39-44, wherein the third measurement metric M3 is signal-to-noise ratio (SNR).

Example 46 includes the method of any of Examples 39-45, wherein the hypothetical UE-specific PDSCH DMRS in current slot n has the same frequency/time allocation and consistent DMRS descrambling configuration with the UE-specific PDSCH DMRS in the previous slot n−1.

Example 47 includes a method performed at a User Equipment (UE), including: extrapolating PDSCH DMRS channel estimates from a previous slot n−1 onto a first DMRS position of a current slot n; measuring the extrapolated PDSCH DMRS channel estimates based on the a received PDSCH DMRS in the previous slot n−1 and frequency domain filtered channel estimates of the current slot n based on a received PDSCH DMRS in the current slot n; computing Mean Square Error (MSE) based on the extrapolated channel estimates and the frequency domain filtered channel estimates of the current slot n; comparing the MSE with a fifth threshold TH5; determining cross-slot DMRS phase continuity between the previous slot n1 and the current slot n based on the result of the comparison; and performing cross-slot PDSCH channel estimation based on the cross-slot DMRS phase continuity between the previous slot n−1 and the current slot n.

Example 48 includes the method of Example 47, wherein the MSE is computed as:

$$MSE = \frac{\|\overline{H}_{n,1} - F\hat{H}_{n-1 \to n}\|^2}{\|\hat{H}_{n-1 \to n}\|^2}$$

where $\hat{H}_{n-1 \to 1}$ represents the extrapolated PDSCH DMRS channel estimates, $\overline{H}_{n,1}$ represents the frequency domain filtered channel estimates of the current slot n associated with DMRS symbol 1, and F represents a compensation of time/frequency offset as well as Automatic Gain Control (AGC) change applied at a slot boundary between the previous slot n−1 and the current slot n.

Example 49 includes the method of Example 47, when the MSE is larger than the fifth threshold TH5 (MSE>TH5), the DMRS phase of the previous slot n−1 and the DMRS phase of the current slot n are determined to be continuous.

Example 50 includes the method of Example 47, wherein performing cross-slot PDSCH channel estimation based on the cross-slot DMRS phase continuity between the previous slot n−1 and the current slot n further including: performing, when the DMRS phase of the previous slot n−1 and the DMRS phase of the current slot n are determined to be continuous, the PDSCH channel estimation in slot n based on the received UE-Specific PDSCH DMRS in slot n1 and the received UE-specific PDSCH DMRS in slot n.

Example 51 includes the method of any of Examples 47-50, wherein the fifth threshold TH5 is dynamically determined by the number of UE receiver antennas and the number of allocated resource blocks (RBs) in a PDSCH grant.

Example 52 includes the method of Example 51, wherein the fifth threshold TH5 decreases with the increase of the number of UE receiver antennas or the number of allocated RBs in a PDSCH grant.

Example 53 includes a non-transitory computer-readable medium having instructions stored thereon, the instructions when executed by one or more processor(s) causing the processor(s) to perform the method of any of Examples 27-38.

Example 54 includes an apparatus for a User Equipment (UE), including means for performing the actions of the method of any of Examples 27-38.

Example 55 includes a non-transitory computer-readable medium having instructions stored thereon, the instructions when executed by one or more processor(s) causing the processor(s) to perform the method of any of Examples 39-46.

Example 56 includes an apparatus for a User Equipment (UE), including means for performing the actions of the method of any of Examples 39-46.

Example 57 includes a non-transitory computer-readable medium having instructions stored thereon, the instructions when executed by one or more processor(s) causing the processor(s) to perform the method of any of Examples 47-52.

Example 58 includes an apparatus for a User Equipment (UE), including means for performing the actions of the method of any of Examples 47-52.

Example 59 includes a User Equipment (UE) as shown and described in the description.

Example 60 includes a method performed at a User Equipment (UE) as shown and described in the description.

Although certain aspects have been illustrated and described herein for purposes of description, a wide variety of alternate and/or equivalent aspects or implementations calculated to achieve the same purposes may be substituted for the aspects shown and described without departing from the scope of the present disclosure. This application is intended to cover any adaptations or variations of the aspects discussed herein. Therefore, it is manifestly intended that aspects described herein be limited only by the appended claims and the equivalents thereof.

What is claimed is:

1. An apparatus for a User Equipment (UE), comprising circuitry configured to:
   measure a UE-specific Demodulation Reference Signal (DMRS) associated with a Physical Downlink Control Channel (PDCCH);
   compute a first measurement metric M1 based on the UE-specific DMRS associated with the PDCCH before decoding the PDCCH;
   decode the PDCCH based on the first measurement metric M1; and
   decode a Physical Downlink Shared Channel (PDSCH) based on the decoded PDCCH.

2. The apparatus of claim 1, wherein when the first metric M1 is not smaller than the first threshold TH1 (M1>=TH1), the PDCCH is decoded.

3. The apparatus of claim 1, wherein the circuitry is further configured to:
   obtain a PDSCH grant associated with the PDSCH from the decoded PDCCH;
   measure the UE-specific DMRS associated with the PDSCH grant;
   compute a second measurement metric M2 based on the UE-specific DMRS associated with the PDSCH grant;
   determine whether the PDSCH grant is valid or not based on the first measurement metric M1 and the second measurement metric M2; and
   decode the PDSCH when the PDSCH grant is valid.

4. The apparatus of claim 3, wherein the circuitry is further configured to:
   compare the sum (M1+M2) of the first measurement metric M1 and the second measurement metric M2 with a second threshold TH2; and
   determine the PDSCH grant is valid when the sum (M1+M2) is larger than the second threshold (M1+M2>TH2).

5. The apparatus of claim 3, wherein the circuitry is further configured to:
   compare the sum (M1+M2) of the first measurement metric M1 and the second measurement metric M2 with a second threshold TH2;
   compare the difference (M2−M1) between the second measurement metric M2 and the first measurement metric M1 with a third threshold TH3; and
   determine the PDSCH grant is valid when the sum (M1+M2) is larger than the second threshold TH2 and the difference (M2−M1) is larger than the third threshold TH3 (M1+M2>TH2 and M2−M1>TH3).

6. The apparatus of claim 1, wherein the first threshold TH1 is dynamically determined based on an aggregation level of PDCCH channel and the number of UE receiver antennas.

7. The apparatus of claim 6, wherein the first threshold TH1 increases with the increase of the aggregation level of PDCCH channel or the number of UE receiver antennas.

8. The apparatus of claim 4, wherein the second threshold TH2 is dynamically determined based on an aggregation level of PDCCH channel, the number of UE receiver antennas and the number of allocated resource blocks (RBs) in the PDSCH grant.

9. The apparatus of claim 8, wherein the second threshold TH2 increases with the increase of the aggregation level of PDCCH channel, the number of UE receiver antennas or the number of allocated RBs in the PDSCH grant.

10. The apparatus of claim 5, wherein the third threshold TH3 is dynamically determined based on the number of allocated resource blocks (RBs) in the PDSCH grant.

11. The apparatus of claim 10, wherein the third threshold TH3 increases with the increase of the number of allocated RBs in the PDSCH grant.

12. The apparatus of claim 1, wherein the first measurement metric M1 and the second measurement metric M2 are signal-to-noise ratio (SNR).

13. An apparatus for a User Equipment (UE), comprising circuitry configured to:
   obtain configuration information of a received UE-specific Physical Downlink Shared Channel (PDSCH) Demodulation Reference Signal (DMRS) associated with a PDSCH grant in a previous slot n−1;
   generate a hypothetical UE-specific PDSCH DMRS in current slot n based on the obtained configuration information of the received UE-specific PDSCH DMRS in the previous slot n−1;
   compute a third measurement metric M3 based on the hypothetical UE-specific PDSCH DMRS;
   compare the third measurement metric M3 with a fourth threshold TH4;
   determine a repeated PDSCH grant is detected in the current slot n when the third measurement metric M3 is larger than the fourth threshold TH4 TH4(M3>TH4); and
   decode the PDSCH in the current slot n based on the detected PDSCH grant.

14. The apparatus of claim 13, wherein the circuitry is further configured to:
   perform PDSCH channel estimation in advance based on the hypothetical UE-specific PDSCH DMRS before finishing decoding of the Physical Downlink Control Channel (PDCCH) in the current slot n; and
   decode the PDSCH in the current slot n based on the detected PDSCH grant.

15. The apparatus of claim 13, wherein the circuitry is further configured to:
   obtain a result of a Cyclic Redundancy Check (CRC) for the PDCCH in the current slot n when the repeated PDSCH grant is detected in the current slot n;
   retrieve, when the CRC fails, Modulation and Coding Scheme (MCS) information from the previous slot n−1; and
   decode the PDSCH in the current slot n by reusing the MCS information from the previous slot n−1.

16. The apparatus of claim 13, wherein the circuitry is further configured to:

obtain a result of a Cyclic Redundancy Check (CRC) for the PDCCH in the current slot n when the repeated PDSCH grant is detected in the current slot n;

determine, when the CRC succeeds, if a PDSCH grant is included in the decoded PDCCH in the current slot n;

extract MCS information from the decoded PDCCH in the current slot n when the PDSCH grant is included in the decoded PDCCH; and decode the PDSCH in the current slot n by using the MCS information from the decoded PDCCH in the current slot n.

17. The apparatus of claim 13, wherein the fourth threshold TH4 TH4is dynamically determined by an aggregation level of PDCCH channel, the number of UE receiver antennas and the number of allocated resource blocks (RBs) in the PDSCH grant.

18. The apparatus of claim 17, wherein the fourth threshold TH4 TH4increases with the increase of the aggregation level of PDCCH channel, the number of UE receiver antennas or the number of allocated RBs in the PDSCH grant.

19. The apparatus of claim 13, wherein the third measurement metric M3 is signal-to-noise ratio (SNR).

20. The apparatus of claim 13, wherein the hypothetical UE-specific PDSCH

DMRS in current slot n has the same frequency/time allocation and consistent DMRS descrambling configuration with the UE-specific PDSCH DMRS in the previous slot n−1.

21. An apparatus for a User Equipment (UE), comprising circuitry configured to:

extrapolate PDSCH DMRS channel estimates from a previous slot n−1 onto a first DMRS position of a current slot n;

measure the extrapolated PDSCH DMRS channel estimates based on the a received PDSCH DMRS in the previous slot n−1 and frequency domain filtered channel estimates of the current slot n based on a received PDSCH DMRS in the current slot n;

compute Mean Square Error (MSE) based on the extrapolated channel estimates and the frequency domain filtered channel estimates of the current slot n;

compare the MSE with a fifth threshold TH5;

determine cross-slot DMRS phase continuity between the previous slot n−1 and the current slot n based on the result of the comparison; and perform cross-slot PDSCH channel estimation based on the cross-slot DMRS phase continuity between the previous slot n−1 and the current slot n.

22. The apparatus of claim 21, wherein the MSE is computed as:

$$MSE = \frac{\|\overline{H}_{n,1} - F\hat{H}_{n-1 \to n}\|^2}{\|\hat{H}_{n-1 \to n}\|^2}$$

where $\hat{H}_{n-1 \to n}$ represents the extrapolated PDSCH DMRS channel estimates, $\overline{H}_{n,1}$ represents the frequency domain filtered channel estimates of the current slot n associated with DMRS symbol 1, and F represents a compensation of time/frequency offset as well as Automatic Gain Control (AGC) change applied at a slot boundary between the previous slot n−1 and the current slot n.

23. The apparatus of claim 21, when the MSE is larger than the fifth threshold TH5 (MSE>TH5), the DMRS phase of the previous slot n−1 and the DMRS phase of the current slot n are determined to be continuous.

24. The apparatus of claim 21, wherein the circuitry is further configured to:

perform, when the DMRS phase of the previous slot n−1 and the DMRS phase of the current slot n are determined to be continuous, the PDSCH channel estimation in slot n based on the received UE-Specific PDSCH DMRS in slot n−1 and the received UE-specific PDSCH DMRS in slot n.

25. The apparatus of claim 22, wherein the fifth threshold TH5 is dynamically determined by the number of UE receiver antennas and the number of allocated resource blocks (RBs) in a PDSCH grant, wherein the fifth threshold TH5 decreases with the increase of the number of UE receiver antennas or the number of allocated RBs in a PDSCH grant.

* * * * *

UNITED STATES PATENT AND TRADEMARK OFFICE
CERTIFICATE OF CORRECTION

PATENT NO. : 11,356,999 B2
APPLICATION NO. : 17/041493
DATED : June 7, 2022
INVENTOR(S) : Xiaojun Ma et al.

It is certified that error appears in the above-identified patent and that said Letters Patent is hereby corrected as shown below:

In the Claims

Column 27, Line 13, Claim 17; please change "TH4 TH4is" to --TH4 is--.

Column 27, Line 18, Claim 18; please change "TH4 TH4increases" to --TH4 increases--.

Signed and Sealed this
Ninth Day of August, 2022

Katherine Kelly Vidal
*Director of the United States Patent and Trademark Office*